United States Patent [19]

Hehl

[11] Patent Number: 4,863,362
[45] Date of Patent: Sep. 5, 1989

[54] PLASTICIZING ASSEMBLY COMPRISING A REINFORCING SKELETON INTENDED FOR USE IN AN INJECTING UNIT OF AN INJECTION MOLDING MACHINE

[76] Inventor: Karl Hehl, Arthur-Hehl-Str. 32, D-7298 Lossburg 1, Fed. Rep. of Germany

[21] Appl. No.: 282,734

[22] Filed: Dec. 12, 1988

[30] Foreign Application Priority Data

Dec. 15, 1987 [DE] Fed. Rep. of Germany ....... 3742403

[51] Int. Cl.$^4$ ............................................. B29C 45/62
[52] U.S. Cl. ................................ 425/190; 425/192 R
[58] Field of Search ............ 425/182, 185, 190, 192 R

[56] References Cited

U.S. PATENT DOCUMENTS

3,068,521 12/1962 Gaspar et al. ........................ 425/568
4,278,354 7/1981 Hehl ..................................... 425/561

Primary Examiner—Jay H. Woo
Assistant Examiner—Timothy W. Heitbrink
Attorney, Agent, or Firm—Spencer & Frank

[57] ABSTRACT

The reinforcing skeleton for use in an injection molding machine comprises skeleton elements having tracks for engaging stationary rollers for guiding a plasticizing cylinder during cyclic axial reciprocating motions performed by the injecting unit during an injection molding sequence. The skeleton elements include track bars spaced from a central length portion of the plasticizing cylinder by radial spacers. One of the spacers has a plate secured to the track bars and to the plasticizing cylinder. Two centering spacers are connected to the track bars and surround the plasticizing cylinder as a sliding fit.

11 Claims, 9 Drawing Sheets

PLASTICIZING ASSEMBLY COMPRISING A REINFORCING SKELETON INTENDED FOR USE IN AN INJECTING UNIT OF AN INJECTION MOLDING MACHINE

BACKGROUND OF THE INVENTION

1. Field of the Invention

This invention relates to a plasticizing assembly for use in an injecting unit of an injection molding machine, comprising a heatable plasticizing cylinder, a rotatable and axially displaceable plasticizing screw that is disposed in said plasticizing cylinder, and a reinforcing skeleton, which partly encloses the plasticizing cylinder and comprises at least one skeleton element which constitutes a track that is spaced from the plasticizing cylinder and serves to cooperate with a stationary roller so as to guide the plasticizing cylinder during the cyclic axial reciprocating motion of the injecting unit during the injection molding sequence.

2. Description of the Prior Art

In a plasticizing assembly of that kind, which is known from U.S. patent application Ser. No. 07/079,109 now abandoned, the reinforcing skeleton elements which constitute tracks for supporting for the plasticizing cylinder when it is at rest and for gripping the plasticizing cylinder when it is to be carried away. The plasticizing cylinder is surrounded in part by a channel-shaped guard, which is connected to the plasticizing cylinder by U-shaped clamping members and carrying bars. To establish the connection, the free end portions of the horizontal bars extend through the vertical legs of the channel-shaped guard, which along its lower bend lines constitutes horizontal and vertical tracks for the stationary rollers. In that respect the guard is a permanent component of the reinforcing skeleton and cannot readily be removed without the assistance of skilled employees of the manufacturer. When a repair or replacement is required, those functional elements of the plasticizing assembly which are disposed within the guard, particularly the heating elements, will be accessible only with difficulty.

From German Patent Publication 29 07 557 and the corresponding U.S. Pat. No. 4,278,354 it is also known to support the plasticizing cylinder of a comparable plasticizing assembly by means of skids on the track rods of the injecting unit.

It is also known from U.S. Pat. No. 3,068,521 that a plasticizing cylinder which is fixedly mounted in the central bore of the receiving body can be protected by an enclosing sheet metal shell.

SUMMARY OF THE INVENTION

It is an object of the invention so to improve a plasticizing assembly which is of the kind described first hereinbefore that the guidance of the plasticizing cylinder as it is periodically moved into and out of engagement with the injection mold during the injection molding sequence is improved, the plasticizing assembly can be assembled from its constituents with a lower assembling expenditure and essential functional elements, particularly for heating, and the associated mounting means and the plug connectors, will be more easily accessible for a replacement, repair and inspection.

That object is accomplished in accordance with the invention in that the track is constituted by a track surface of a track bar, which is spaced from the plasticizing cylinder by radial spacers, one of the spacers is fixedly connected to the track bar and the plasticizing cylinder and at least one centering spacer is connected to the track bar and surrounds the plasticizing cylinder as a sliding fit and defines a clearance with the plasticizing cylinder.

In such an arrangement the guard has no supporting and guiding functions during the injection molding sequence because said functions are assigned to stabler skeleton elements of the reinforcing skeleton. For this reason the parts of the guard can readily be removed by the operators regardless of the location and of the relation to the injection unit. An additional advantage afforded by the invention resides in that the track bars constitute stable skeleton elements and can be used also as means which are engageable by handling means for carrying the plasticizing cylinder away because said track bars are disposed in a gap between the top and bottom halves of a guard so that they are accessible to such handling means. The plasticizing assembly can be taken apart with a very small disassembling expenditure and as a standardized module may contain plasticizing cylinders which differ in size whereas the overall dimensions of the reinforcing skeleton and the guard need not be changed.

Two channel-shaped guard plates may be assembled to form a quadrangular-section tube, which surrounds the middle portion of the plasticizing cylinder and the associated reinforcing skeleton and said guard plates may engage the spacers and the track bars. The plasticizing cylinder and the quadrangular-section tube may be received in its middle portion between the legs of a U-shaped bracket, which is included in the plasticizing assembly and is adapted to be supported on the pedestal of the injection molding machine, and the rollers may be supported on the legs of said U-shaped bracket. Such an arrangement will result in a simple guidance of the plasticizing cylinder because the stationary rollers are rotatably mounted in a U-shaped bracket, which on its underside is at least indirectly fixed in position to the pedestal of the machine and is fixed in position on its upper side to axially fixed track rods for guiding the injecting unit. That portion of the plasticizing cylinder which protrudes from the quadrangular-section tube is received from the rear as an axial sliding fit in the bore of a receiving body of the injecting unit and the plate may be provided with a plug connector plate designed for making axial plug connections. In that case the plasticizing cylinder and the associated reinforcing skeleton can be supported in a state of stable equilibrium on beams to which the legs of the U-shaped bracket are pivoted. When the plasticizing cylinder has been axially fixed in that supported position by means of a locking pin, the plasticizing cylinder may be released from the receiving body to that the cylinder can be lifted and carried away.

DETAILED DESCRIPTION OF THE PREFERRED EMBODIMENT

An illustrative embodiment of the invention will now be described more in detail with reference to the drawing.

Figure 1:
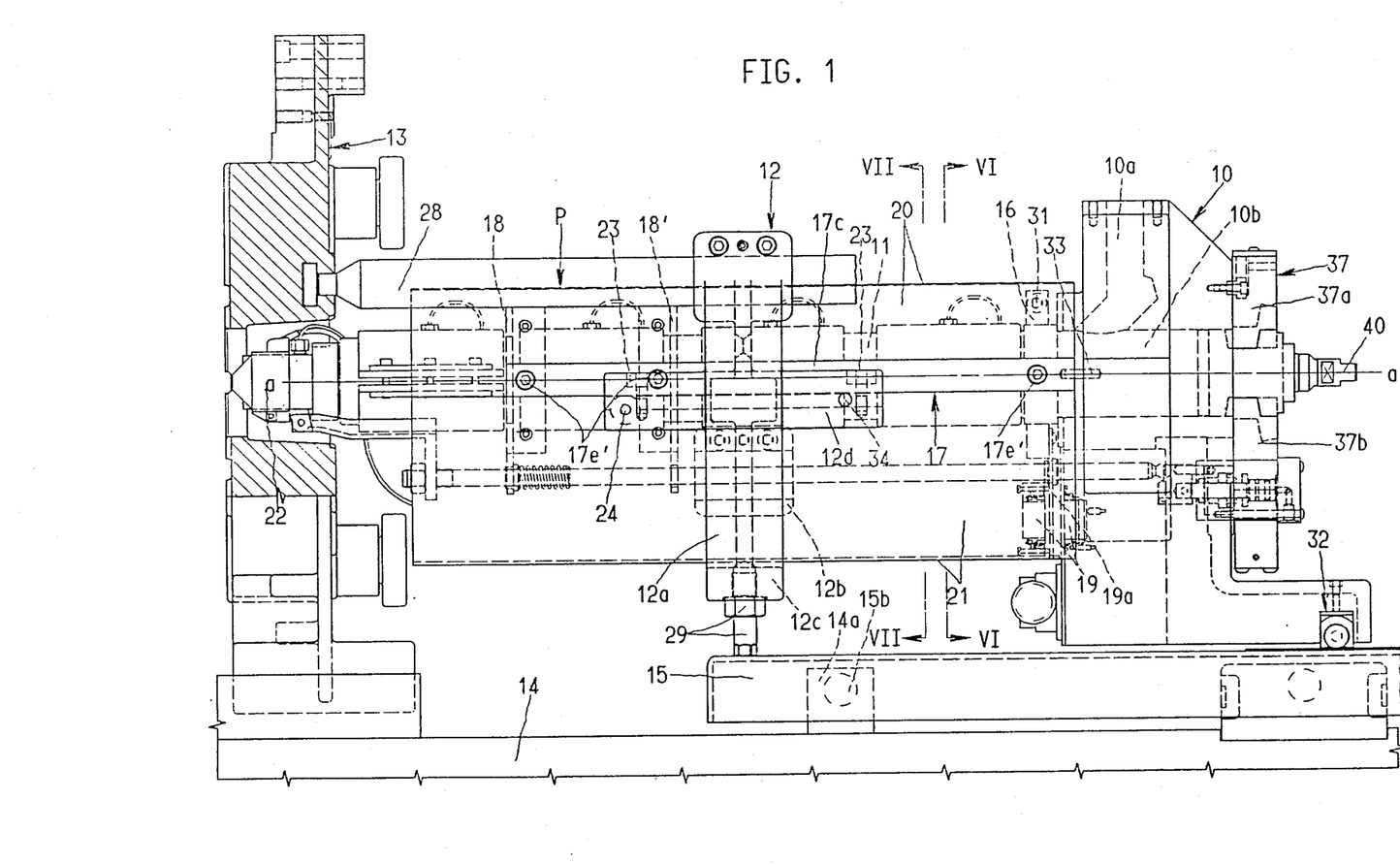
FIG. 1 shows the plasticizing assembly for use in the injecting unit of an injection molding machine in position on the pedestal of such machine.
Figure 2:
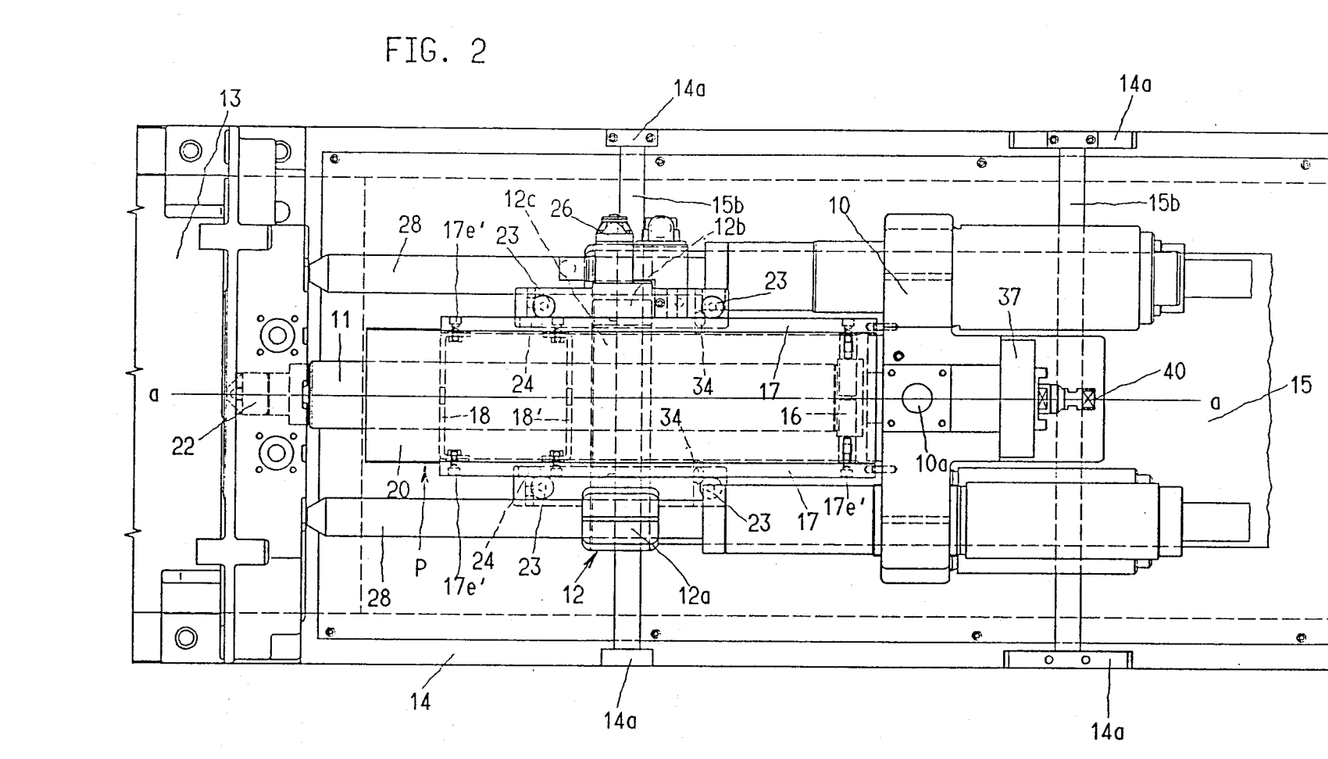
FIG. 2 shows on a smaller scale the arrangement of FIG. 1 together with the advance-retract cylinders and the injecting cylinders of the injecting unit.

As is particularly apparent from FIGS. 1 and 2, the plasticizing assembly P is a constituent part of an injection unit, which is mounted on a supporting deck 15 of an injection molding machine. As is apparent from FIG. 2 in conjunction with FIG. 1, the supporting deck is slidably mounted on track rods 15b, which extend at right angles to the injection axis a-a of the injecting unit and are mounted in bearing brackets 14a of the machine pedestal 14. This permits the injecting unit to be used in association with different injecting molds having sprues at different locations. The injection mold is mounted in a clamping unit, which comprises a mold carrier 13, which is shown on the left in FIGS. 1 and 2.

Figure 3:
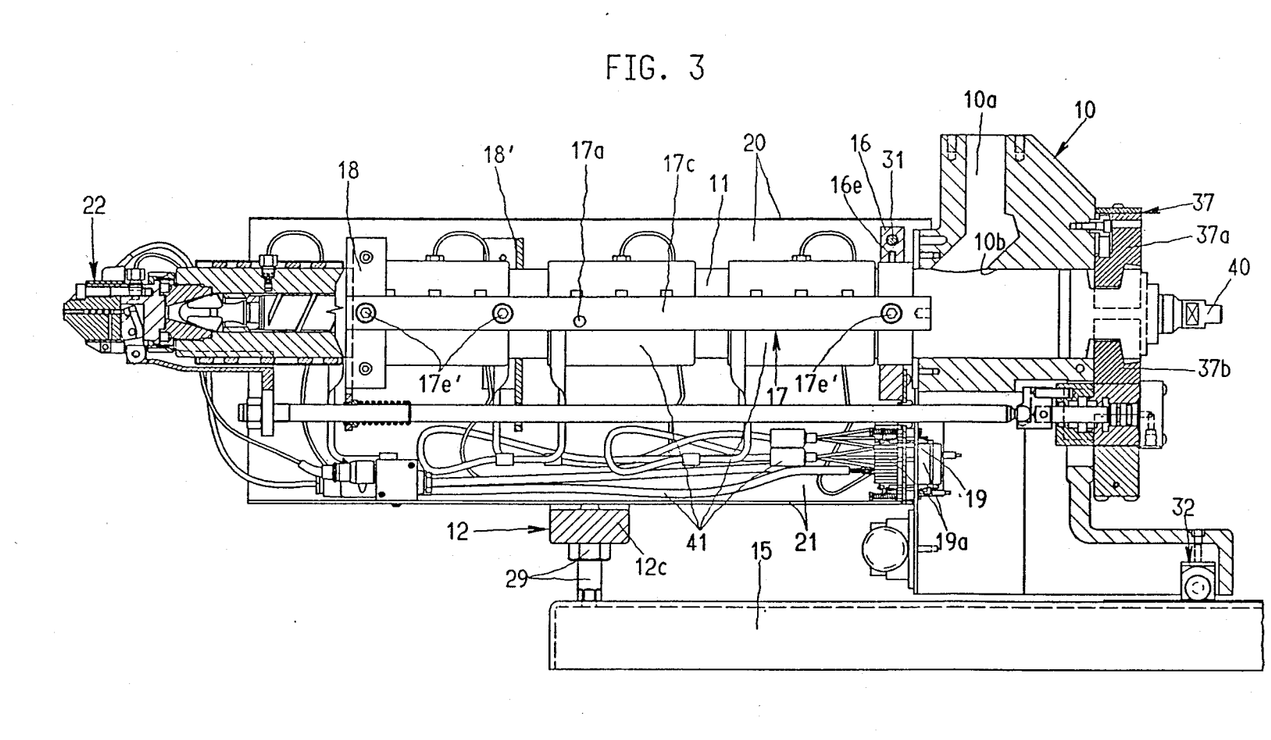
FIG. 3 shows in side elevation, partly in a section through the vertical plane of symmetry, the plasticizing assembly which is supported on a supporting deck of an injection molding machine.
Figure 4:
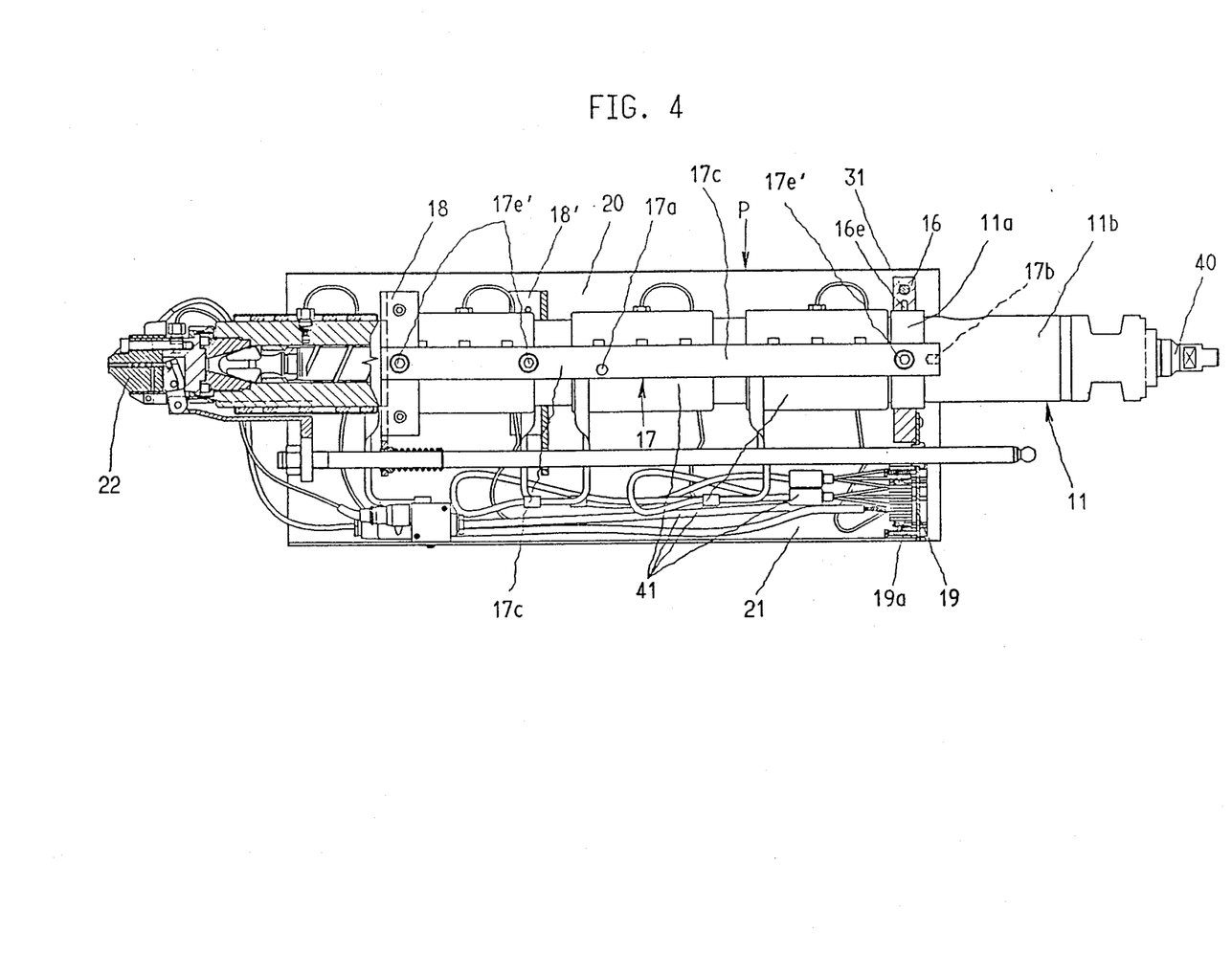
FIG. 4 shows the arrangement of FIG. 3 without the receiving body for the plasticizing cylinder and without a supporting deck for the injecting unit and without the U-shaped bracket which carries the rollers.
Figures 5, 5A, 5B, 5C:
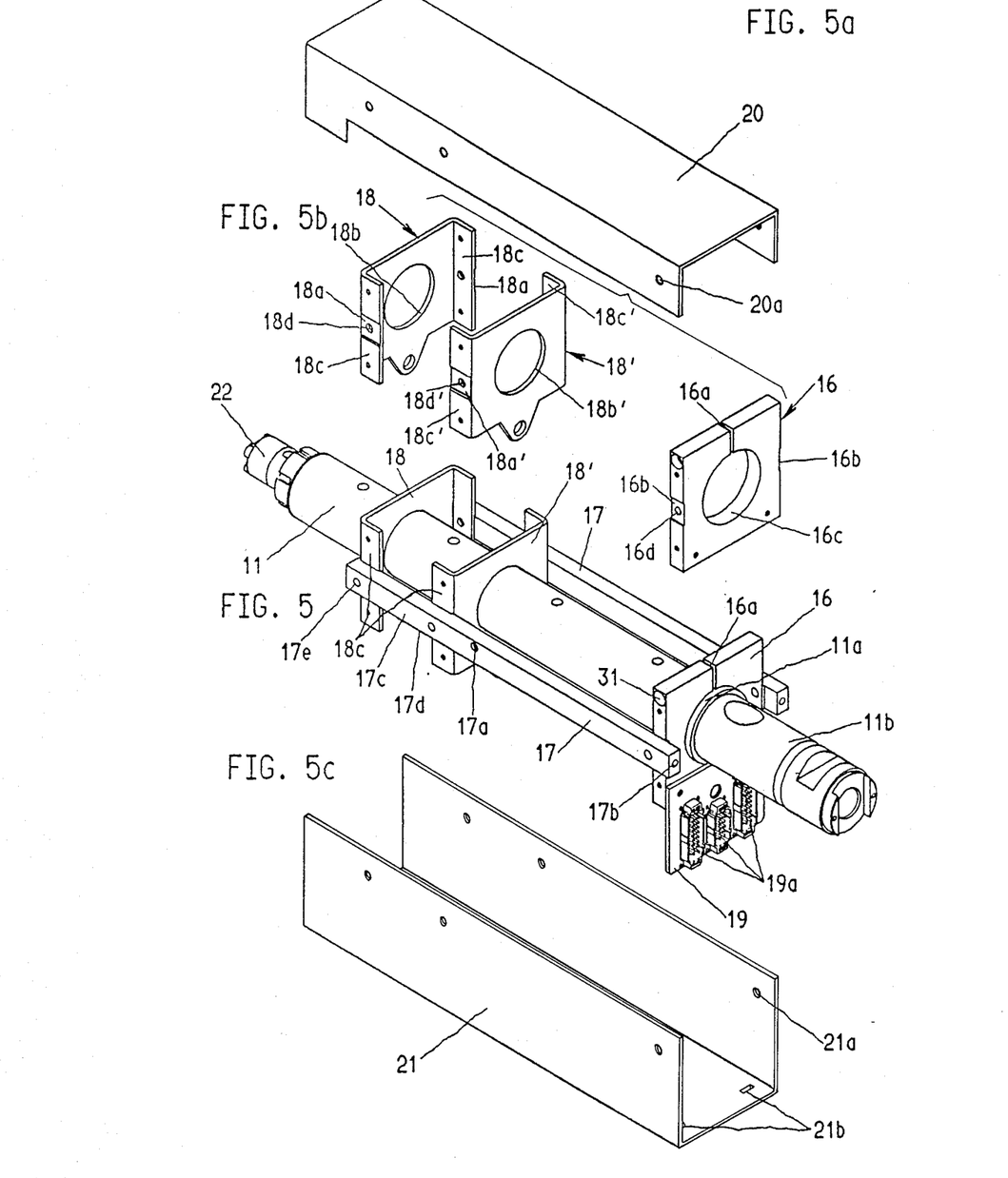
FIG. 5 is a perspective view showing the plasticizing cylinder of the plasticizing assembly and the associated reinforcing skeleton.
FIGS. 5a and 5c show those parts of the guard which constitute the quadrangular-section tube of the plasticizing assembly.
FIG. 5b shows reinforcing elements of the plasticizing assembly.

The essential parts of the plasticizing assembly P comprise a plasticizing cylinder 11, which is provided with heating means 41 shown in FIGS. 3 and 4, a plasticizing screw 40, which is disposed in the plasticizing cylinder 11 and is rotatable and axially displaceable, a reinforcing skeleton 16; 17; 18; 18', which partly surrounds the plasticizing cylinder 11, and a stationary U-shaped bracket 12, in which rollers 23; 24 are rotatably mounted. Skeleton elements of the reinforcing skeleton constitute tracks 17c; 17d, which are in contact with stationary rollers 23; 24 for guiding the plasticizing cylinder 11 during the cyclic reciprocating axial motion performed by the injecting unit during the injection molding sequence. As is particularly apparent from FIG. 5, the tracks 17c; 17d are constituted by track surfaces of track bars 17, which are radially spaced by radial spacers from the central length section of the plasticizing cylinder 11. One spacer 16 consists of a plate which is secured to the track bars 17 and to the plasticizing cylinder 11. Two centering spacers 18; 18' are secured to the track bars 17 and surround the plasticizing cylinder with a clearance to provide a sliding fit. The two track bars 17 are rectangular in cross-section and are disposed diametrically opposite to each other with respect to the plasticizing cylinder in a horizontal plane which extends through the injection axis a-a. The spacer [16] which is secured to the plasticizing cylinder consists of a plate 16, which is approximately square and formed with a radial slot 16a. The plasticizing cylinder 11 extends through the plate 16, which axially bears on a radial flange 11a (FIG. 5), which is provided on the rear portion of the plasticizing cylinder. The plate 16 is forced against the shell of the plasticizing cylinder by means of a clamping screw, which bridges the vertical slot 16a. As the screw 31 is tightened, the plate 16 will reversibly be deformed in that the portions disposed on both sides of the slot are moved toward each other. The forward portion of the plasticizing cylinder is enclosed by two spaced apart centering spacers 18; 18', which are constituted by U-shaped sheet metal stampings. The track bars 17 are secured by bolts 17e' (FIGS. 1, 4) at one end to the vertical legs 18c, 18c' of the centering sheet metal spacers 18; 18' and at the other end to vertical side edges of the plate 16. The bolts 17e' extend through fixing bores 17e (FIG. 5) of the track bars 17 and are screwed into tapped bores 16d, 18d, 18d' (FIG. 5b) of the spacers. The centering spacers 18; 18' have circular cut edges, which define a sliding fit with the shell of the plasticizing cylinder and constitute sliding surface bearings permitting slight axial movements of the plasticizing cylinder as the latter is heated. Particularly from FIGS. 5 to 7 it is apparent how two channel-shaped guard plates 20, 21 have been assembled to constitute a quadrangular-section tube, which surrounds the central length portion of the plasticizing cylinder 11 and of the associated reinforcing skeleton 16; 17; 18; 18'. The guard plates 20, 21 are supported on the spacers in that webs of the guards plates 20 and 21 bear on the top and bottom edges of the plate 16 and the vertical legs of the U-shaped plates 20 and 21 at their fixing bores 20a, 21a bear on the vertical side edges of the plate 16 and on the vertical legs 18c; 18c' of the centering spacers 18; 18'. As is particularly apparent from FIGS. 6 and 7, the longitudinal edges of the upper guard plate 20 bear on the top surfaces of the two track bars 17 and the longitudinal edges of the lower guard plate 21 bear on the bottom surfaces of the two track bars 17. The track bars 17 virtually protrude from the quadrangular-section tube 20, 21 so that the remaining portions of their horizontal bottom surface and their outer vertical side face are exposed to form respective tracks 17d and 17c for engagement by the rollers 24 and 23. As is particularly apparent from FIG. 5b, the reinforcing skeleton is stabilized in that the track bars 17 are received in recesses 18a, 18a', 16b of the vertical legs 18c, 18c' of the U-shaped reinforcing skeleton and of the vertical side edges to provide an interlock. FIG. 5b shows the fixing bores 18d; 18d' in the legs 18c and the fixing bores 16d in the plate 16. Said bores serve to receive the fixing bolts 17e'. The rear end portion 11b of the plasticizing cylinder 11 protrudes from the rear of the quadrangular-section tube and is received in a central bore 10b of a receiving body 10 of the injecting unit as an axial sliding fit. The plasticizing cylinder 11 can be locked in that position to a clamping device 37 by means of sliders 37a, 37b, which are guided on the rear of the receiving body 10 and in locking position are received by corresponding recesses of the plasticizing cylinder (FIG. 3). A plug connector plate 19 is secured to the lower portion of the plate 16 and downwardly protrudes from the bottom edge of the plate 16 and is retained in locking slots 21b (FIG. 5c) of the lower guard plate 21. The plug connector plate 19 is designed for an axial plug connection and carries male plug connector elements 19a, which cooperate with corresponding female plug connector elements of the receiving body 10 for the energization of the heating means associated with the plasticizing cylinder and its nozzle 22 and of the associated temperature sensors and the like. In the present embodiment the plasticizing cylinder 11 can be removed from the receiving body 10 in that the latter is hydraulically withdrawn from the rear portion of the plasticizing cylinder to the rear and the plasticizing cylinder is subsequently unlocked. As the receiving body is moved rearwardly from the locked plasticizing cylinder 11, the female plug connector elements of the receiving body 10 are removed from the plugs 19a of the plug connector plate 19 after the circuit has been opened. The receiving body 10 is supported at its rear end on the supporting deck 15 by means of a support 32.

The plasticizing cylinder 11 and the associated quadrangular-section tube 20, 21 is received between the legs 12a; 12b of a U-shaped bracket 12, which is adapted to be supported on the pedestal 14 of the injection molding machine. The U-shaped bracket 12 is disposed approximately at the center of the length of the plasticizing cylinder. The U-shaped bracket 12 consists of a casting, the design of which is particularly apparent from the perspective view in FIG. 8. The two legs 12a and 12b of the bracket 12 differ in length and are interconnected by a horizontal crosspiece 12c. The free end portions of the legs 12a; 12b are clamped by means of clamping sleeves 12e to track rods 28 for guiding the injecting unit. Said track rods 28 are axially fixed to the stationary mold carrier 13. Each of the legs 12a; 12b is provided with a mounting beam 12d, which is parallel to the injection axis a-a. Two rollers 23 are rotatably mounted in each mounting beam 12d and cooperate with the vertical track 17c of the adjacent track bar 17 and are spaced by a distance which is almost as large as the length of the mounting beam 12d. A further roller 24 is rotatably mounted on each mounting beam 12d at its forward end and bears on a horizontal track surface 17d of the adjacent track bar 17. When the plasticizing cylinder has been released from the receiving body and by its reinforcing skeleton 16; 17; 18; 18' is placed on the mounting means 12d in a state of stable equilibrium, the plasticizing cylinder 11 can further be supported by a bearing member 34, which is anchored in a recess 12h at the rear end of each mounting beam 12d. In that case the plasticizing cylinder 11 is supported by the associated track bars 17 on the rollers 24 and on the supporting pins 34. The U-shaped bracket 12 is adjustably supported and fixed in position on the supporting deck 15 by supporting elements 29 (FIG. 8).

Figure 7:
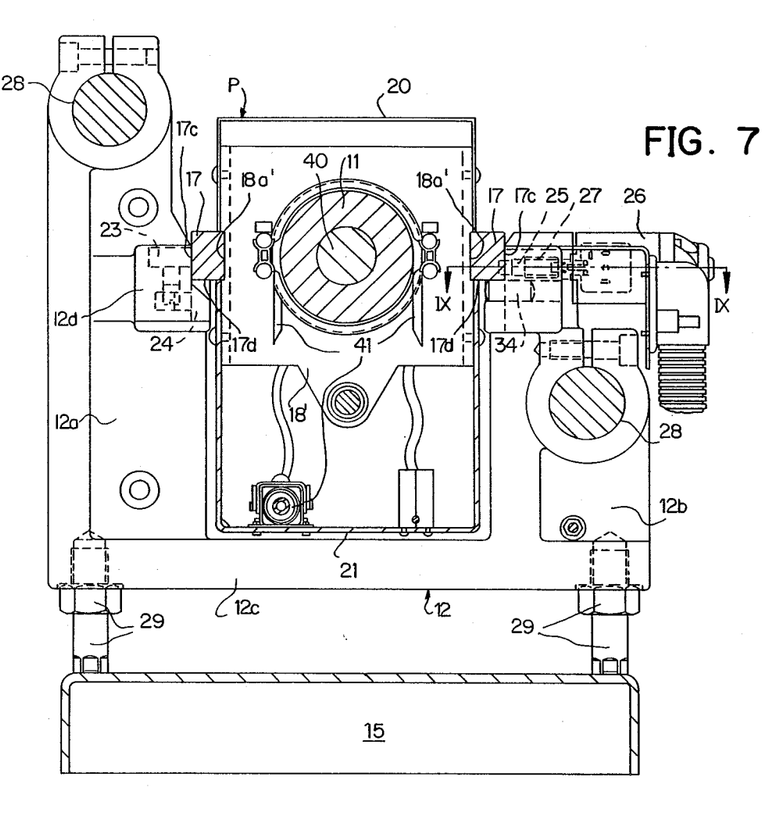
FIG. 7 is a sectional view taken on line VII—VII of FIG. 1 without the stationary fixing plate of the injection molding machine.
Figure 9:
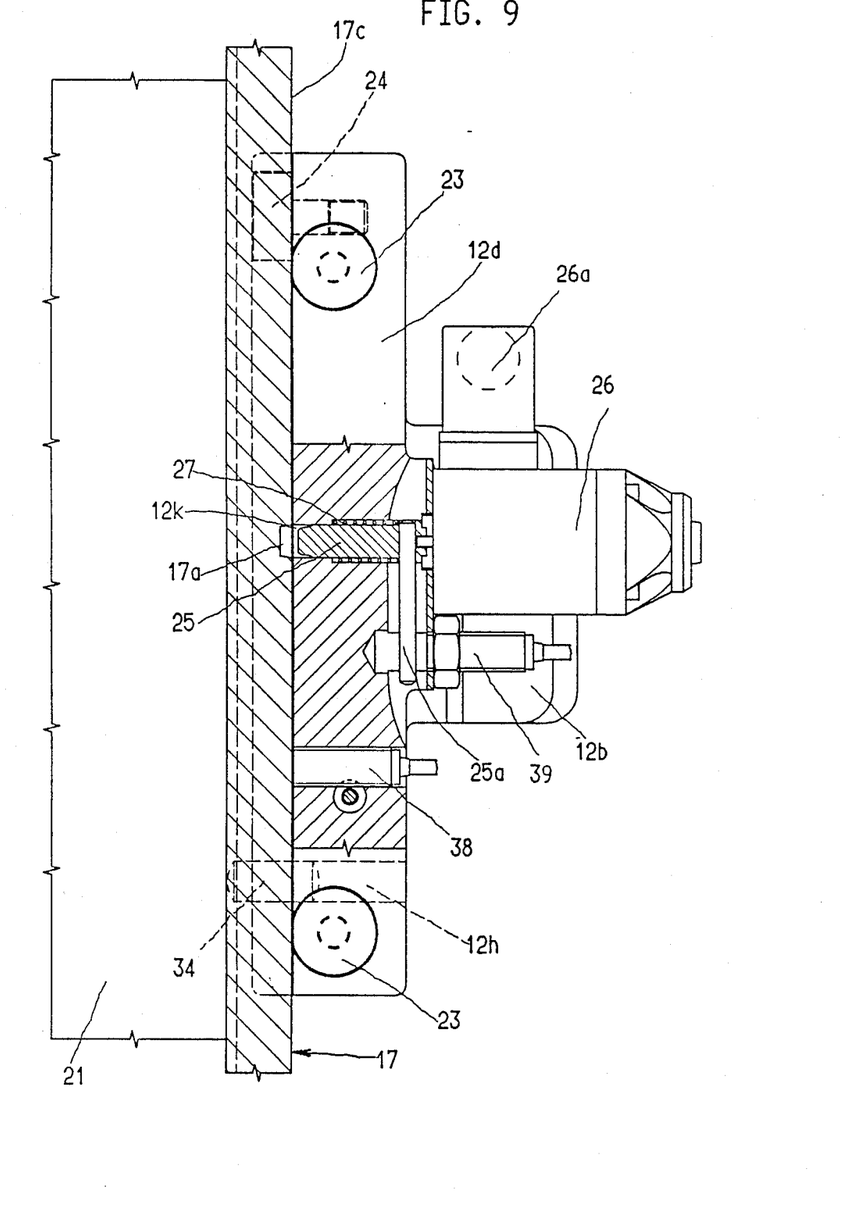
FIG. 9 is a top plan view, which is partly broken away and illustrates a portion of the plasticizing assembly adjacent to the locking pin for axially locking the plasticizing cylinder.

The mounting beam 12d associated with the shorter leg 12b is formed with a horizontal through bore 12k, in which a locking pin 25 is horizontally slidably mounted, as is particularly apparent from FIGS. 7 and 9. By means of a solenoid 26 the locking pin 25 can be moved against the action of a spring 27 into a locking opening 17a formed in the adjacent track bar 17. The solenoid 26 is energizable by means of a plug 26a and is controlled by a switch 39, which is connected by an actuating pin 25a to the locking pin 25. The mounting beam 12d provided with the locking pin 25 is provided with a switch 38, which cooperates with the track bar 17 to generate control signals indicating the presence of the plasticizing cylinder to an associated computer. The receiving body 10 is provided with a feed hopper 10a.

Figure 6:
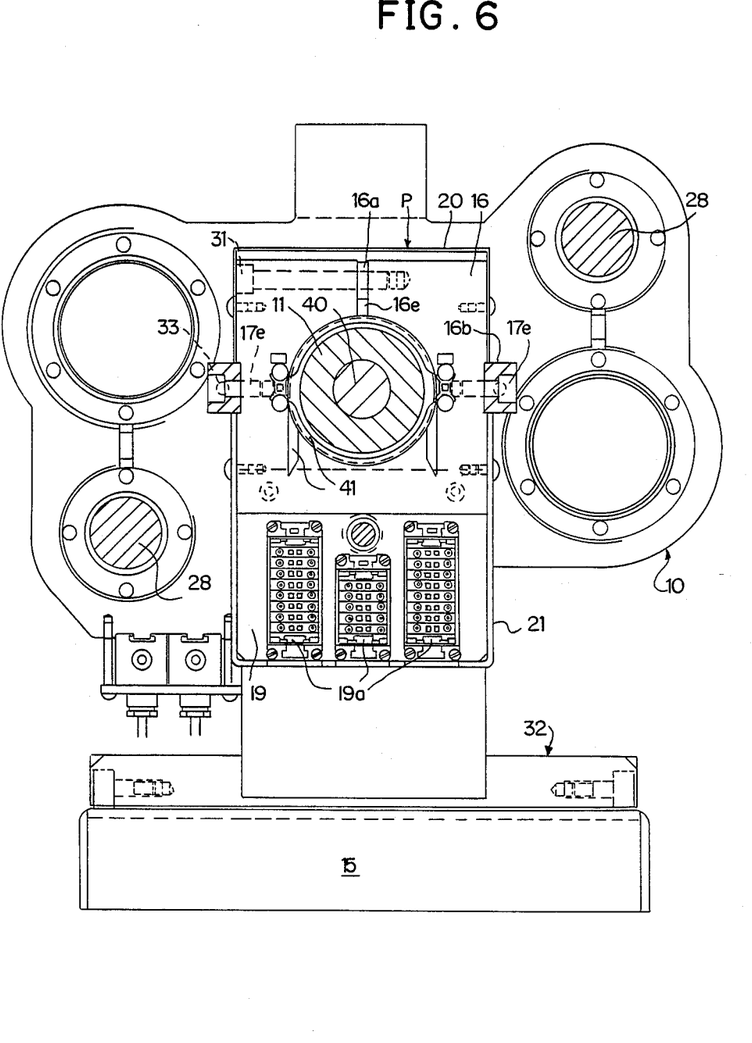
FIG. 6 is a sectional view taken on line VI—VI in FIG. 1 and shows the receiving body provided with the advance-retract cylinders and the injecting cylinders of the injecting unit.

As is apparent from FIGS. 1 and 3 to 5, the reinforcing skeleton associated with the plasticizing cylinder 11 is radially retained in that pins 33 extend into centering bores 17b (FIG. 5) of the track bars 17 and into registering centering bores of the receiving body 10. A radial pin 16e carried by the plasticizing cylinder locks the plate 16 against a rotation (FIG. 6).

Figure 8:
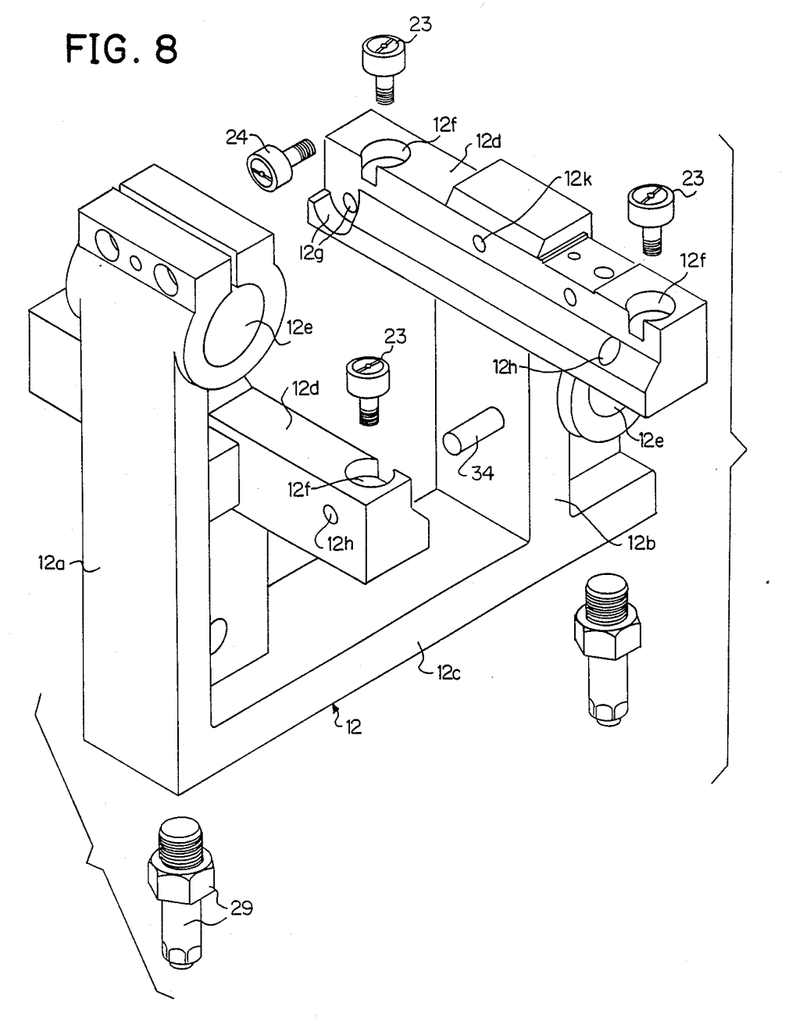
FIG. 8 is an enlarged perspective view showing the cast U-shaped bracket of the plasticizing assembly with the associated rollers, bearing and supporting elements.

As is particularly apparent from FIG. 7 in conjunction with FIG. 8, each of the rollers 23, 24 is provided with a screw-threaded shaft, which is so received in a cylindrical recess 12f or 12g of the mounting beam 12d that a relatively small portion of the peripheral surface of the roller protrudes from the body of the mounting beams 12d for engagement with the adjacent track 17c or 17d.

If the inside diameter of each of the bores 16c; 18b' and 18b (FIG. 5b) of the spacers is property dimensioned, the plasticizing assembly P which constitutes a standardized module may selectively be provided with plasticizing cylinders differing in size whereas the overall dimensions of the reinforcing skeleton and of the guard plates 20, 21 need not be changed. Such a standardization may be highly significant if suitable standardized changing means are provided for changing the plasticizing assembly.

I claim:
1. In a plasticizing assembly for use in a horizontally extending injection unit, which defines an injection axis and is included in an injection molding machine and operable to perform a cyclic axial reciprocating motion, comprising
   a heatable plasticizing cylinder,
   a plasticizing screw, which is contained in and rotatably and axially displaceably mounted in said plasticizing cylinder,
   stationary roller means, and
   a reinforcing skeleton, which partly surrounds said plasticizing cylinder and comprises axially extending track means for cooperating with said roller means to axially guide said plasticizing cylinder during said reciprocating motion of said injecting unit,
   said track means being radially spaced from said plasticizing cylinder,
   the improvement residing in that
   said track means comprises track bar means and
   spacing means for radially spacing said track bar means from said plasticizing cylinder, said spacing means comprising a first spacer connected to said track bar means and to said plasticizing cylinder, and at least one centering spacer connected to said track bar means and surrounding said plasticizing cylinder with a clearance providing a sliding fit.

2. The improvement set forth in claim 1, wherein
   said track bar means comprises two track bars being rectangular in cross section and arranged on opposite sides of said plasticizing cylinder on a horizontal diametral plane extending through said injection axis,
   said first spacer comprising a substantially square plate surrounding the plasticizing cylinder, said first space having a radial slot, and
   a pin extending through said radial slot for locking said plate against rotation.

3. The improvement set forth in claim 2, wherein each of said guide bars is square in cross section.

4. The improvement set forth in claim 1, wherein
two centering spacers are provided and being axially spaced apart and consisting of a U-shaped sheet metal stamping having two vertical legs,
said first spacer comprising a plate having vertical side edges,
said track bar means comprising two track bars secured to said legs and to said vertical side edges, and
said centering spacers having inner peripheral edges cooperating with an outside peripheral surface of said plasticizing cylinder to form sliding surface bearings.

5. The improvement set forth in claim 1, wherein
two channel-shaped guard plates are assembled to form a rectangular-section tube, surrounding said plasticizing cylinder and said reinforcing skeleton at an intermediate portion of their length and
said guard plates engaging said spacing means and said guide bar means.

6. The improvement set forth in claim 5, wherein said injecting unit comprises a receiving body having a bore,
said plasticizing cylinder comprising a portion protruding forwardly from said rectangular-section tube and being adapted to be received as an axial sliding fit in said bore and
said first spacer being provided with a plug connector plate having axially extending plug connector elements.

7. The improvement set forth in claim 5, wherein said injection molding machine comprises a pedestal,
said plasticizing assembly comprising a stationary U-shaped bracket adapted to be supported on said pedestal and comprising legs, in which said roller means are rotatably mounted, and
said legs extending on opposite sides of said plasticizing cylinder and said rectangular-section tube adjacent to the center of the length of said cylinder and tube.

8. The improvement set forth in claim 7, wherein said injection molding machine comprises axial track rods for guiding said injecting unit,
said U-shaped bracket comprising a casting and its legs having free ends, which are connected to said track rods,
each of said legs being provided with a mounting beam extending parallel to said injection axis,
said track bar means comprising two track bars,
each of said track bars comprising a vertical track surface and a horizontal track surface, and
mounting beams each carrying three rotatably mounted rollers, two of said rollers bearing on said vertical track and one of said rollers bearing on said horizontal track surface of one of said track bars.

9. The improvement set forth in claim 8, wherein said injecting unit comprises a receiving body having a bore for releasably receiving at least a portion of said plasticizing cylinder,
each of said mounting beams carrying a bearing member spaced from said one roller mounted on said beam,
said plasticizing cylinder being adapted to be released and removed from said receiving body and being adapted to be supported by said reinforcing skeleton on said bearing elements.

10. The improvement set forth in claim 7, wherein
said track bar means comprises two track bars extending on opposite sides of said plasticizing cylinder,
one of said track bars being formed with a horizontal locking opening,
one of said legs being adjacent to said one track bar and being provided with a horizontally slidably mounted locking pin registering with and being movable into said locking bore,
spring means opposing movement of said locking pin into said locking bore,
a solenoid being operatively connected with said locking pin and energizable to move said locking pin into said locking bore against a force of said spring,
a switch for controlling the energization of said solenoid, and
said locking pin carrying an actuating pin for actuating said switch.

11. The improvement set forth in claim 7 wherein said, injection molding machine has a pedestal supporting a motor-operable supporting deck capable of a limited movement transversely to said injection axis,
said plasticizing assembly being adapted to be mounted on said supporting deck and
supporting elements for adjustably fixing said bracket to said supporting deck in a desired position.

* * * * *